(12) United States Patent
Godet

(10) Patent No.: US 9,884,714 B2
(45) Date of Patent: Feb. 6, 2018

(54) CONTAINER PROVIDED WITH AN INVERTIBLE DIAPHRAGM AND A CENTRAL PORTION OF GREATER THICKNESS

(71) Applicant: SIDEL PARTICIPATIONS, Octeville-sur-Mer (FR)

(72) Inventor: Florian Godet, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 15/318,620

(22) PCT Filed: Jun. 4, 2015

(86) PCT No.: PCT/EP2015/062506
§ 371 (c)(1),
(2) Date: Dec. 13, 2016

(87) PCT Pub. No.: WO2015/193121
PCT Pub. Date: Dec. 23, 2015

(65) Prior Publication Data
US 2017/0113860 A1    Apr. 27, 2017

(30) Foreign Application Priority Data

Jun. 18, 2014 (EP) ..................................... 14305931

(51) Int. Cl.
*B65D 8/04*        (2006.01)
*B65D 79/00*       (2006.01)
(Continued)

(52) U.S. Cl.
CPC ............ *B65D 79/005* (2013.01); *B29C 49/08* (2013.01); *B29C 49/6445* (2013.01);
(Continued)

(58) Field of Classification Search
CPC ........ B65D 79/00; B65D 79/005; B65D 1/00; B65D 1/02; B65D 1/0207; B65D 1/40;
(Continued)

(56) References Cited

U.S. PATENT DOCUMENTS 2,124,959 A * 7/1938 Vogel ...................... B65B 31/00
                                                       220/624
3,485,355 A * 12/1969 Stewart .............. B65D 21/0231
                                                       206/427
(Continued)

OTHER PUBLICATIONS

International Search Report, dated Aug. 19, 2016, from corresponding PCT Application.

*Primary Examiner* — Steven A. Reynolds
*Assistant Examiner* — Javier A Pagan
(74) *Attorney, Agent, or Firm* — Young & Thompson

(57) ABSTRACT

Container made of a plastic material, provided with a base including a standing ring forming a support flange and a diaphragm extending from the standing ring to a central portion, the diaphragm being capable of standing in an outwardly-inclined position, the diaphragm connecting to the standing ring at an outer junction forming an outer articulation of the diaphragm with respect to the standing ring; the diaphragm connecting to the central portion at an inner junction forming an inner articulation of the diaphragm with respect to the central portion; the diaphragm being invertible with respect to the standing ring to an inwardly-inclined position; the central portion having a thickness greater than the diaphragm, the central portion having an annular section of greater thickness adjacent to the inner junction, the central portion having a central recess thinner than the annular section and protruding upwardly from an inner edge of the annular section.

15 Claims, 4 Drawing Sheets

(51) Int. Cl.
  *B65D 1/02* (2006.01)
  *B29C 49/08* (2006.01)
  *B29C 49/64* (2006.01)
  *B65D 1/42* (2006.01)
  *B29C 49/06* (2006.01)
  *B29K 105/00* (2006.01)
  *B29K 267/00* (2006.01)
  *B29L 31/00* (2006.01)

(52) U.S. Cl.
  CPC ......... *B65D 1/0207* (2013.01); *B65D 1/0246* (2013.01); *B65D 1/0276* (2013.01); *B65D 1/42* (2013.01); *B29C 49/06* (2013.01); *B29K 2105/258* (2013.01); *B29K 2267/003* (2013.01); *B29L 2031/7158* (2013.01)

(58) Field of Classification Search
  CPC .... B65D 1/42; B65D 1/44; B65D 1/46; B29C 49/08; B29C 49/085; B29C 49/64; B29C 49/6409; B29C 49/6436; B29C 49/6445
  USPC .................................................. 220/623, 624
  See application file for complete search history.

(56) References Cited

U.S. PATENT DOCUMENTS

| | | | | |
|---|---|---|---|---|
| 4,892,205 A * | 1/1990 | Powers | ............... | B29C 49/0078 215/375 |
| 5,472,105 A * | 12/1995 | Krishnakumar | ..... | B65D 1/0223 215/384 |
| 5,503,283 A * | 4/1996 | Semersky | ............ | B65D 1/0276 215/375 |
| 6,769,561 B2 * | 8/2004 | Futral | .................. | B65D 1/0276 215/371 |
| 7,077,279 B2 * | 7/2006 | Melrose | ............... | B65D 1/0223 215/381 |
| 7,150,372 B2 * | 12/2006 | Lisch | ................... | B65D 1/0276 215/371 |
| 2003/0196926 A1 * | 10/2003 | Tobias | ................. | B65D 1/0284 206/509 |
| 2004/0016716 A1 * | 1/2004 | Melrose | ............... | B65D 1/0223 215/381 |
| 2004/0149677 A1 * | 8/2004 | Slat | ...................... | B65D 1/0276 215/380 |
| 2004/0211746 A1 * | 10/2004 | Trude | ................... | B65D 1/0276 215/374 |
| 2006/0006133 A1 * | 1/2006 | Lisch | ................... | B65D 1/0276 215/374 |
| 2006/0138074 A1 * | 6/2006 | Melrose | ............... | B65D 1/0276 215/373 |
| 2006/0255005 A1 * | 11/2006 | Melrose | ............... | B65B 7/2835 215/381 |
| 2007/0084821 A1 * | 4/2007 | Bysick | ................. | B65D 1/0276 215/373 |
| 2007/0181403 A1 * | 8/2007 | Sheets | .................. | B65D 1/0261 198/617 |
| 2007/0199915 A1 * | 8/2007 | Denner | ................ | B65D 1/0276 215/375 |
| 2007/0199916 A1 * | 8/2007 | Denner | ................ | B65D 1/0223 215/381 |
| 2007/0215571 A1 * | 9/2007 | Trude | ..................... | B29C 49/08 215/373 |
| 2008/0047964 A1 * | 2/2008 | Denner | ................... | B29C 49/06 220/624 |
| 2014/0061211 A1 * | 3/2014 | Patcheak | .................. | B65D 1/0276 220/609 |
| 2015/0352773 A1 * | 12/2015 | Bunel | ................... | B29B 11/14 425/522 |
| 2017/0144817 A1 * | 5/2017 | Godet | ................... | B65D 79/005 |

* cited by examiner

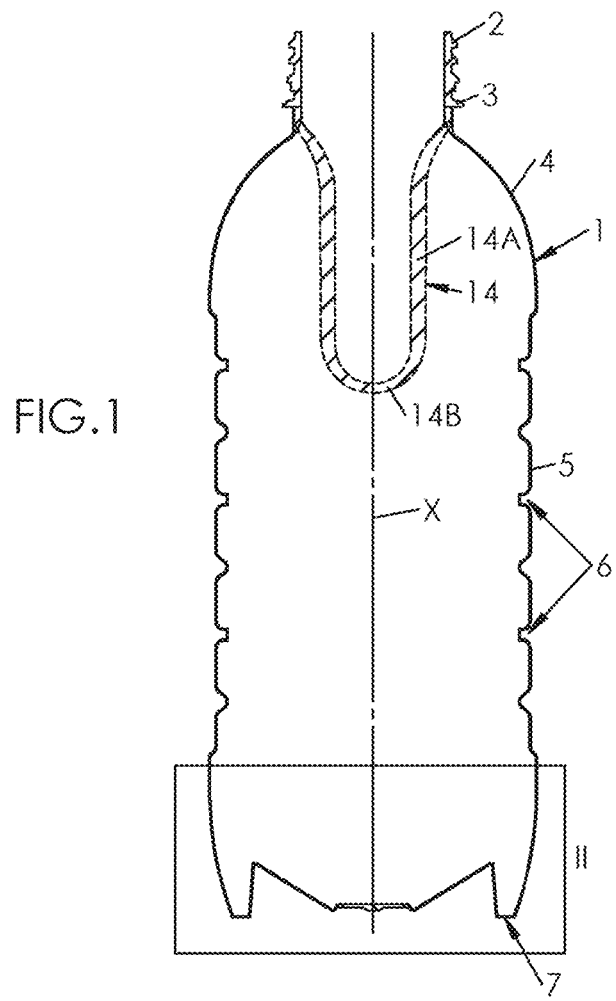
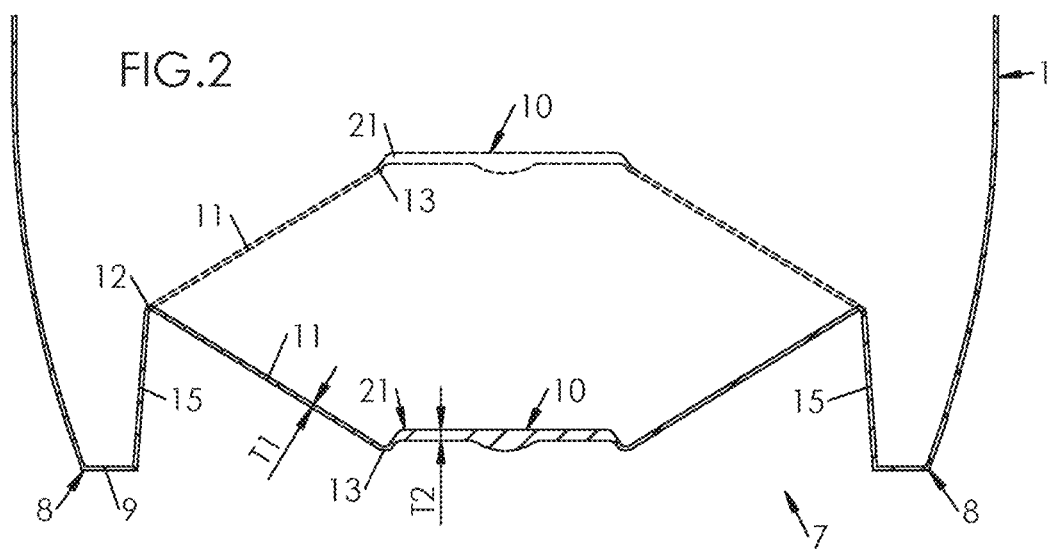

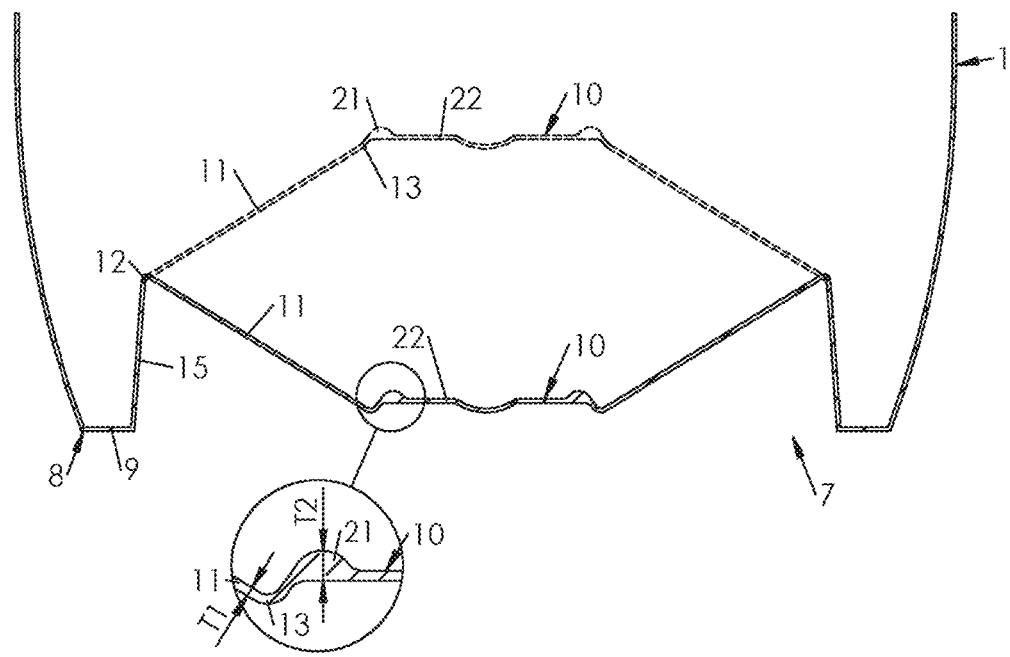
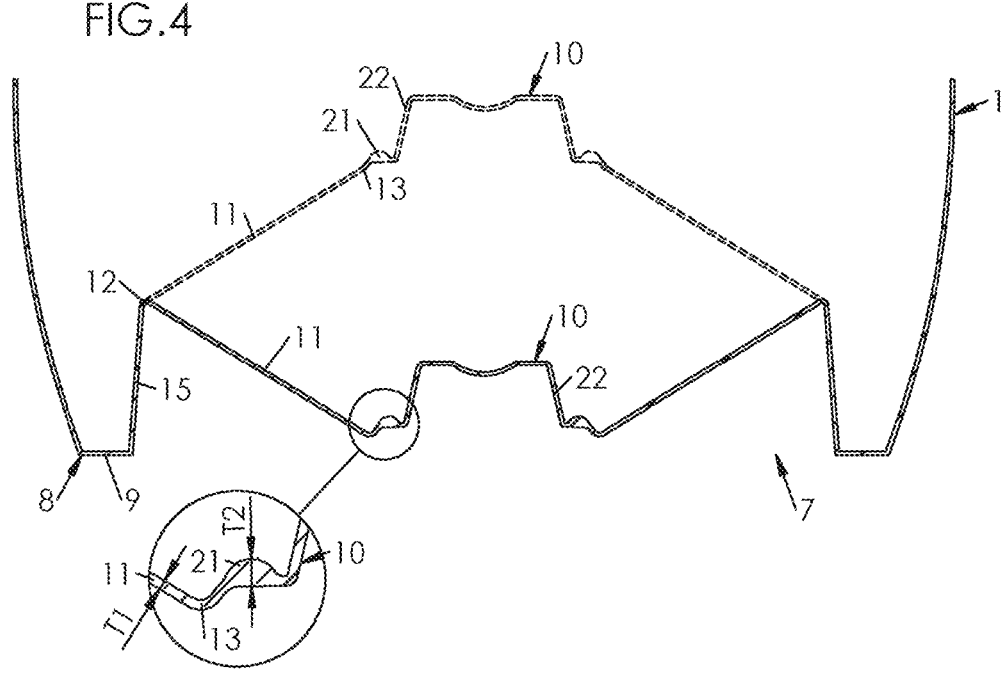

CONTAINER PROVIDED WITH AN INVERTIBLE DIAPHRAGM AND A CENTRAL PORTION OF GREATER THICKNESS

FIELD OF THE INVENTION

The invention generally relates to the manufacturing of containers, such as bottles, which are produced by blow molding or stretch-blow molding from preforms made of plastic (mostly thermoplastic, e.g. PET) material. More specifically but not exclusively, the invention relates to the processing of hot-fill containers, i.e. containers filled with a hot pourable product (typically a liquid), the term "hot" meaning that the temperature of the product is greater than the glass transition temperature of the material in which the container is made. Typically, hot filling of PET containers (the glass transition temperature of which is of about 80° C.) is conducted with products at a temperature comprised between about 85° C. and about 100° C., typically at 90° C.

BACKGROUND OF THE INVENTION

U.S. Pat. Appl. No. 2008/0047964 (Denner et al, assigned to CO2PAC) discloses a container comprising a pressure panel located in the bottom portion of the container. According to Denner, the pressure panel is movable between an outwardly-inclined position and an inwardly-inclined position to compensate for a change of pressure inside the container. In order to alleviate all or a portion of the vacuum forces within the container, the pressure panel is moved from the outwardly-inclined position by a mechanical pusher after the container has been capped and cooled, in order to force the pressure panel into the inwardly-inclined position.

Tests conducted on such a container showed that, once inverted to the inwardly-inclined position, the pressure panel does not maintain its position but tends to sink back under the pressure of the content. In the end, after the content has cooled, the container has lost much rigidity and therefore feels soft when held in hand. When stacking or palletizing the containers, there is a risk for the lower containers to bend under the weight of upper containers, and hence a risk for the whole pallet to collapse.

SUMMARY OF THE INVENTION

It is an object of the invention to propose a container having greater stability.

It is another object of the invention to propose a container provided with an invertible diaphragm capable of maintaining an inverted position.

It is therefore provided a container made of a plastic material, provided with a base including a standing ring forming a support flange and a diaphragm extending from the standing ring to a central portion, said diaphragm being capable of standing in an outwardly-inclined position, wherein the diaphragm connects to the standing ring at an outer junction forming an outer articulation of the diaphragm with respect to the standing ring;

wherein the diaphragm connects to the central portion at an inner junction forming an inner articulation of the diaphragm with respect to the central portion:

whereby said diaphragm is invertible with respect to the standing ring to an inwardly-inclined position;

and wherein the central portion has a thickness greater than the diaphragm, at least in an annular section adjacent to the inner junction.

The section of greater thickness adjacent the inner junction provides rigidity in the inverted position, which prevents the diaphragm from sinking back. Pressure within the container is thereby maintained to a high value, providing high rigidity to the container.

According to various embodiments, taken either separately or in combination:

the whole central portion has a thickness greater than the diaphragm;

the central portion has an annular section of greater thickness adjacent to the inner junction, and a central recess thinner than the annular section and protruding upwardly from an inner edge thereof;

the diaphragm has a thickness T1, and the central portion has, at least in the annular section adjacent to the inner junction, a thickness T2 such that:

$$T2 \geq 1.5 \cdot T1$$

the thickness T2 of the central portion at least in the annular section adjacent to the inner junction is such that:

$$T2 \geq 2 \cdot T1$$

the standing ring is a high standing ring provided with a frusto-conical inner wall, a top end of which forms the outer junction or articulation, whereby in the outwardly-inclined position the central portion stands above the standing ring.

The above and other objects and advantages of the invention will become apparent from the detailed description of preferred embodiments, considered in conjunction with the accompanying drawings.

BRIEF DESCRIPTION OF THE DRAWINGS

FIG. 1 is a sectional view showing both a preform in dotted line) and a resulting container formed therefrom;

FIG. 2 is an enlarged sectional view showing the base of the container within the frame II of FIG. 1, both in an outwardly-inclined position of the diaphragm (in continuous line) and in an inwardly-inclined position thereof (in dotted line), according to a first embodiment;

FIG. 3 is a view similar to FIG. 2, showing a second embodiment;

FIG. 4 is a view similar to FIG. 2, showing a third embodiment.

DETAILED DESCRIPTION

Figure 5:
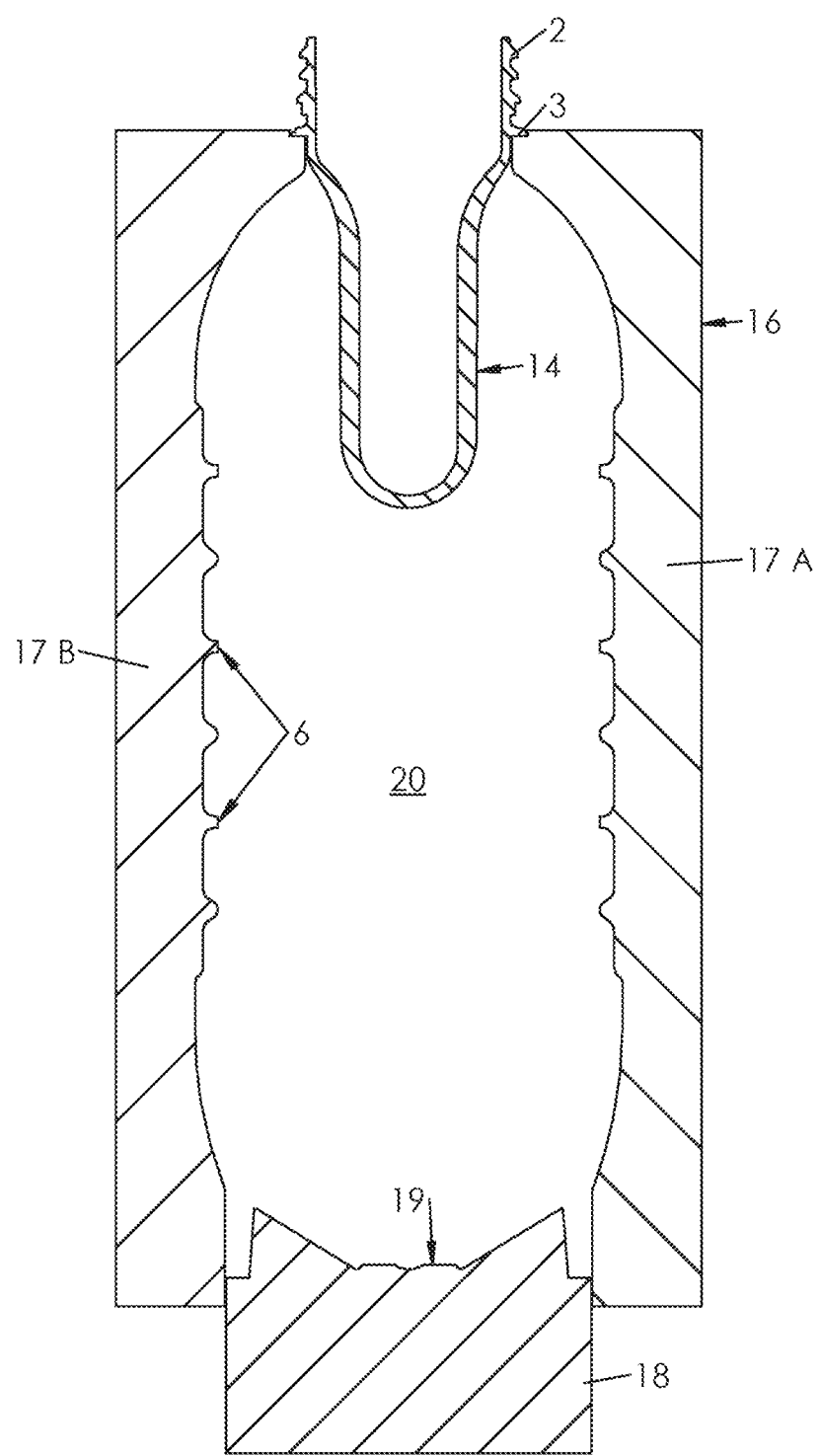
FIG. 5 is a sectional view of a blow mold for the manufacturing of a container from a preform, this mold including movable base shown in a retracted position.

FIG. 1 shows a container 1 suitable for being filled with a hot product (such as tea, fruit juice, or a sports drink).

The container 1 includes an upper open cylindrical threaded or portion or neck 2, which terminates, at a lower end thereof, in a support collar 3 of greater diameter. Below the collar 3, the container 1 includes a shoulder 4 which is connected to the collar 3 through a cylindrical upper end portion of short length.

Below the shoulder 4, the container 1 has a wall portion 5 which is substantially cylindrical around a container main axis X. The wall portion 5 may, as depicted on FIG. 1 and FIG. 2, include annular stiffening ribs 6 capable of resisting stresses which would otherwise tend to make the wall portion 5 oval when viewed in a horizontal section (such a deformation is standard and called ovalization).

At a lower end of the wall portion 5, the container 1 has a base 7 which closes the container 1 and allows the container 1 to be put on a planar surface such as a table.

The container base 7 includes a standing ring 8 which forms a support flange 9 extending in a plane substantially perpendicular to the main axis X, a central portion 10 and a diaphragm 11 extending from the standing ring 8 to the central portion 10.

The diaphragm 11 connects to the standing ring 8 at an outer junction 12 and to the central portion 10 at an inner junction 13. Both the outer junction 12 and the inner junction 13 are preferably curved (or rounded).

The container 1 is blow-molded from a preform 14 (in dotted line in FIG. 1) including the unchanged neck 2, a cylindrical wall 14A and a rounded bottom 14B.

The container 1 is blow-molded with the diaphragm 11 standing in an outwardly-inclined position wherein the inner junction 13 is located below the outer junction 12 (the container 1 being held normally neck up). The diaphragm 11 has a thickness T1.

The outer junction 12 forms an outer articulation of the diaphragm 11 with respect to the standing ring 8 and the inner junction 13 forms an inner articulation of the diaphragm 11 with respect to the central portion 10, whereby the diaphragm 11 is invertible with respect to the standing ring 8 from the outwardly-inclined position to an inwardly-inclined position, wherein the inner junction 13 is located above the inner junction 12 (in dotted lines on FIG. 2, FIG. 3 and FIG. 4).

In a preferred embodiment depicted on the drawings, the standing ring 8 is a high standing ring, i.e. the standing ring is provided with a frusto-conical inner wall 15, a top end of which forms the outer junction 12 (and hence the outer articulation with the diaphragm 11), whereby in the outwardly-inclined position of the diaphragm 11 the central portion 10 stands above the standing ring 8.

Figure 6:
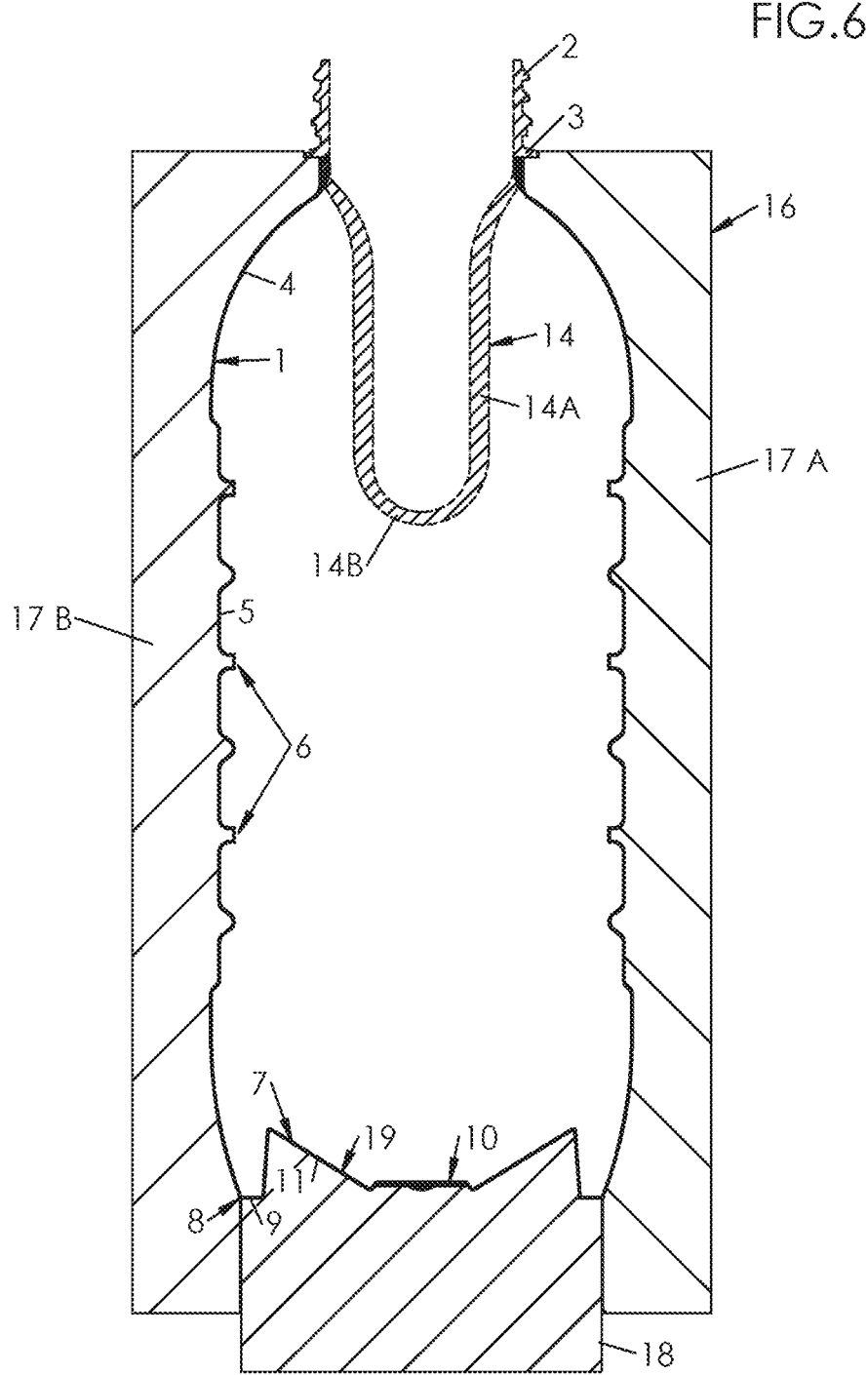
FIG. 6 is a view similar to FIG. 5, showing the container formed from the preform (in dotted line) and the mold base in a raised position.

The container 1 is blow-molded in a blow mold 16 provided with a sidewall made of at least two parts or shells 17A, 17B and a mold base 18 having an upper surface 19 which forms a counter print of the container base 7 including the support flange 9, the inner wall 15, the diaphragm 11 and the central portion 10. The sidewall 17A, 17B, together with the mold base 18, form a molding cavity 20 having the shape of the container 1, The mold base 18 is movable with respect to the sidewall 17A, 17B, between a retracted position (FIG. 5) in which the upper surface 19 extends below the container base 7 to be molded, and a raised position (FIG. 6) in which the upper surface 19 closes the cavity and extends at the exact place of the container base 7 to be blow molded.

This provides an over stretching of the material of the container base 7 (with respect to the material of the wall portion 5) during the blow molding whereby the material of the preform 14 is first stretched beyond the final position of the container base 7, in the retracted position of the mold base 18, and then the mold base 18 is moved to its raised position in order to push the stretched material up to form the final shape of the container base 7. The thus stretched material has an increased crystallinity, and despite its thinness has good mechanical properties.

However, in the present case, the central portion 10 is preserved from being over stretched, at least in an annular section 21 (in which the central portion 10 has a thickness T2) adjacent to the inner junction 13 (i.e. adjacent to the inner articulation with the diaphragm 11).

This is achieved by a specific heating of the preform 14, which is heated at a greater temperature in the wall 14A and in a peripheral portion of the bottom 14B (corresponding to the standing ring 8 and diaphragm 11 than in the center of the bottom 14B, corresponding to the central portion 10.

Such a selective heating may be achieved by means of a heating unit equipped with precisely impinging heating sources.

Therefore, in the central portion 10, at least the annular section 21 remains amorphous during the blow-molding and during the raising movement of the mold base 18 and has a thickness T2 which is greater than the thickness T1 of the diaphragm 11. In a preferred embodiment, thickness T2 is such that T2≥1.5·T1, and even, preferably, T2≥2·T1.

In one embodiment depicted on FIG. 1 and FIG. 2, the whole central portion 10 has a thickness greater than the diaphragm 11. In alternate embodiments depicted on FIG. 3 and FIG. 4, only the annular section 21 is of greater thickness, whereas a central section 22 located within the annular section 21 is thinner than the annular section 21. In the embodiment of FIG. 3, the central section 22 is flat. In the embodiment of FIG. 4, the central section 22 forms a central recess protruding upwardly from an inner edge of the annular section 21.

Inversion of the diaphragm 11 may be achieved mechanically (e.g. with a pusher mounted on a jack), after the container 1 has been filled with a product and capped, in order to compensate for the vacuum generated by the cooling of the product or to increase its internal pressure, and to provide rigidity to the wall portion 5.

The annular section 21 or the whole central portion 10 (in the embodiment of FIG. 1 and FIG. 2) provides a vault stiffening and locking function in the inverted position of the diaphragm 11 (in dotted line on FIG. 2. FIG. 3 and FIG. 4) which is prevented to sink and articulate back to its initial position (i.e. outwardly-inclined) under the pressure of the content of the container 1.

The invention claimed is:

1. Container (1) made of a plastic material, provided with a base (7) including a standing ring (8) forming a support flange (9) and a diaphragm (11) extending from the standing ring (8) to a central portion (10), said diaphragm (11) being capable of standing in an outwardly-inclined position,
   wherein the diaphragm (11) connects to the standing ring (8) at an outer junction (12) forming an outer articulation of the diaphragm (11) with respect to the standing ring (8);
   wherein the diaphragm (11) connects to the central portion (10) at an inner junction (13) forming an inner articulation of the diaphragm (11) with respect to the central portion (10);
   whereby said diaphragm (11) is invertible with respect to the standing ring (8) to an inwardly-inclined position;
   whereby the central portion (10) has a thickness greater than the diaphragm (11), wherein the central portion (10) has an annular section (21) of greater thickness adjacent to the inner junction (13), the central portion (10) having a central recess (22) thinner than the annular section (21) and protruding upwardly from an inner edge of the annular section (21).

2. Container (1) according to claim 1, wherein the whole central portion (10) has a thickness greater than the diaphragm (11).

3. Container (1) according to claim 2, wherein the diaphragm (11) has a thickness T1, and the central portion (10) has, at least in the annular section (21) adjacent to the inner junction (13), a thickness T2 such that $$T2 \geq 1.5 \cdot T1.$$

4. Container (1) according to claim 3, wherein $$T2 \geq 2 \cdot T1.$$

5. Container (1) according to claim 3, wherein the standing ring (8) is a high standing ring (8) provided with a frusto-conical inner wall (15), a top end of which forms the outer junction (12), whereby in the outwardly-inclined position the central portion (10) stands above the standing ring (8).

6. Container (1) according to claim 2, wherein the diaphragm (11) has a thickness T1, and the central portion (10) has, at least in the annular section (21) adjacent to the inner junction (13), a thickness T2 such that $$T2 \geq 2 \cdot T1.$$

7. Container (1) according to claim 6, wherein the standing ring (8) is a high standing ring (8) provided with a frusto-conical inner wall (15), a top end of which forms the outer junction (12), whereby in the outwardly-inclined position the central portion (10) stands above the standing ring (8).

8. Container (1) according to claim 2, wherein the standing ring (8) is a high standing ring (8) provided with a frusto-conical inner wall (15), a top end of which forms the outer junction (12), whereby in the outwardly-inclined position the central portion (10) stands above the standing ring (8).

9. Container (1) according to claim 1, wherein the diaphragm (11) has a thickness T1, and the central portion (10) has, at least in the annular section (21) adjacent to the inner junction (13), a thickness T2 such that $$T2 \geq 1.5 \cdot T1.$$

10. Container (1) according to claim 9, wherein $$T2 \geq 2 \cdot T1.$$

11. Container (1) according to claim 10, wherein the standing ring (8) is a high standing ring (8) provided with a frusto-conical inner wall (15), a top end of which forms the outer junction (12), whereby in the outwardly-inclined position the central portion (10) stands above the standing ring (8).

12. Container (1) according to claim 9, wherein the standing ring (8) is a high standing ring (8) provided with a frusto-conical inner wall (15), a top end of which forms the outer junction (12), whereby in the outwardly-inclined position the central portion (10) stands above the standing ring (8).

13. Container (1) according to claim 1, wherein the diaphragm (11) has a thickness T1, and the central portion (10) has, at least in the annular section (21) adjacent to the inner junction (13), a thickness T2 such that $$T2 \geq 2 \cdot T1.$$

14. Container (1) according to claim 13, wherein the standing ring (8) is a high standing ring (8) provided with a frusto-conical inner wall (15), a top end of which forms the outer junction (12), whereby in the outwardly-inclined position the central portion (10) stands above the standing ring (8).

15. Container (1) according to claim 1, wherein the standing ring (8) is a high standing ring (8) provided with a frusto-conical inner wall (15), a top end of which forms the outer junction (12), whereby in the outwardly-inclined position the central portion (10) stands above the standing ring (8).

* * * * *